P. B. MARFIELD.
FRICTION CLUTCH.
APPLICATION FILED FEB. 19, 1910.
981,295.
Patented Jan. 10, 1911.
3 SHEETS—SHEET 1.
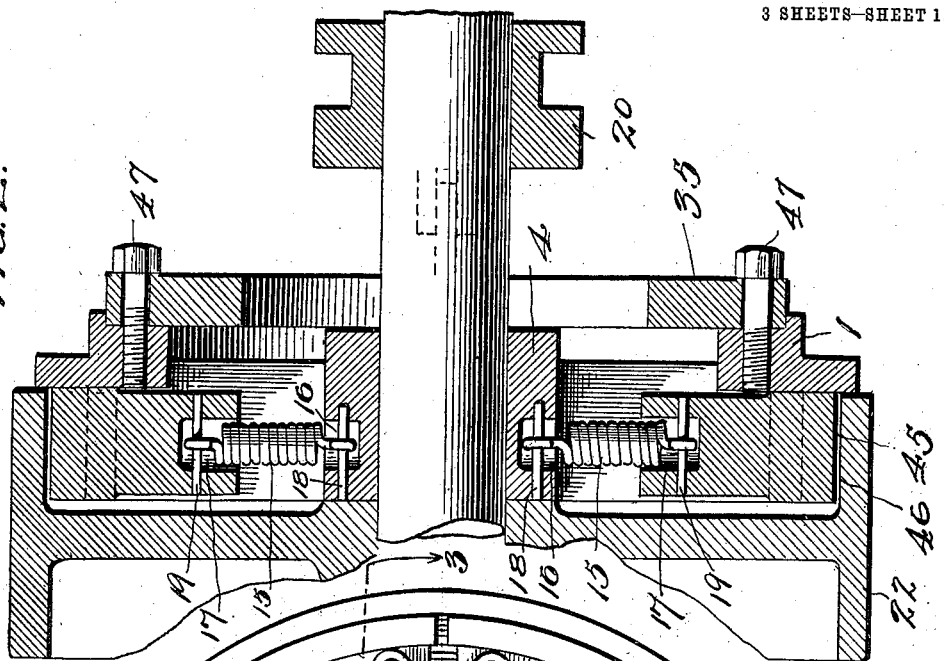
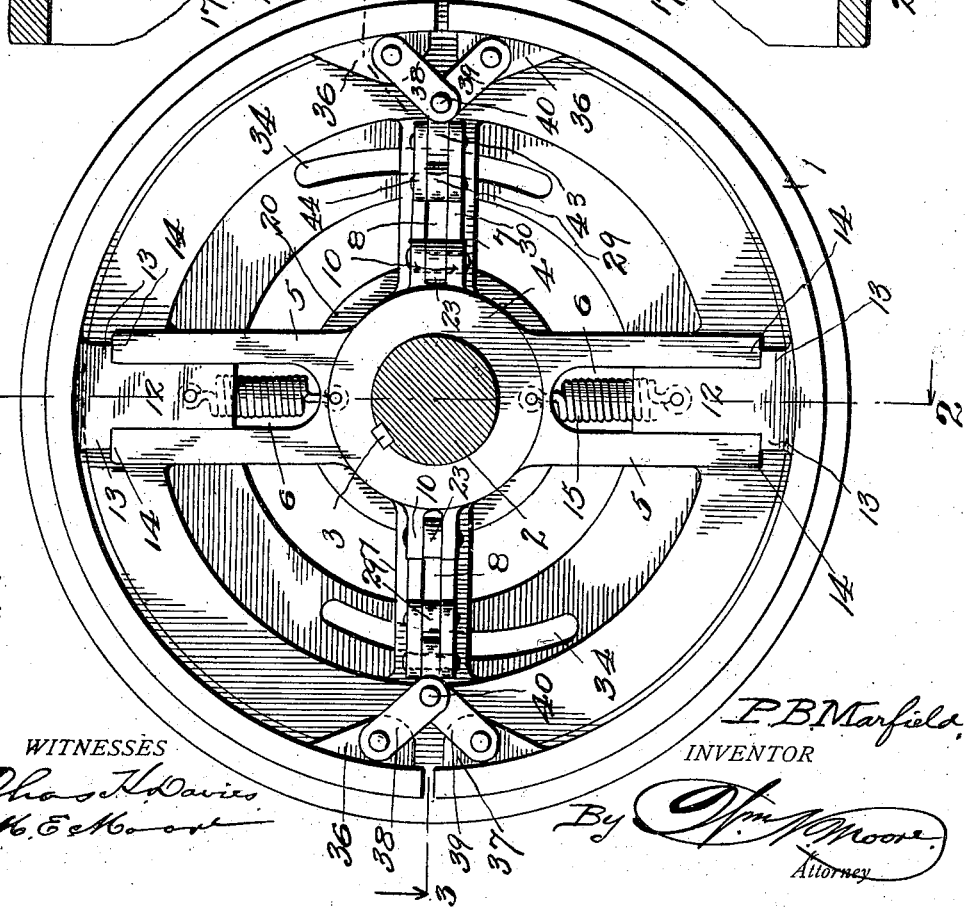
WITNESSES
INVENTOR
P. B. Marfield,
By
Attorney P. B. MARFIELD.
FRICTION CLUTCH.
APPLICATION FILED FEB. 19, 1910.
981,295.
Patented Jan. 10, 1911.
3 SHEETS—SHEET 2.
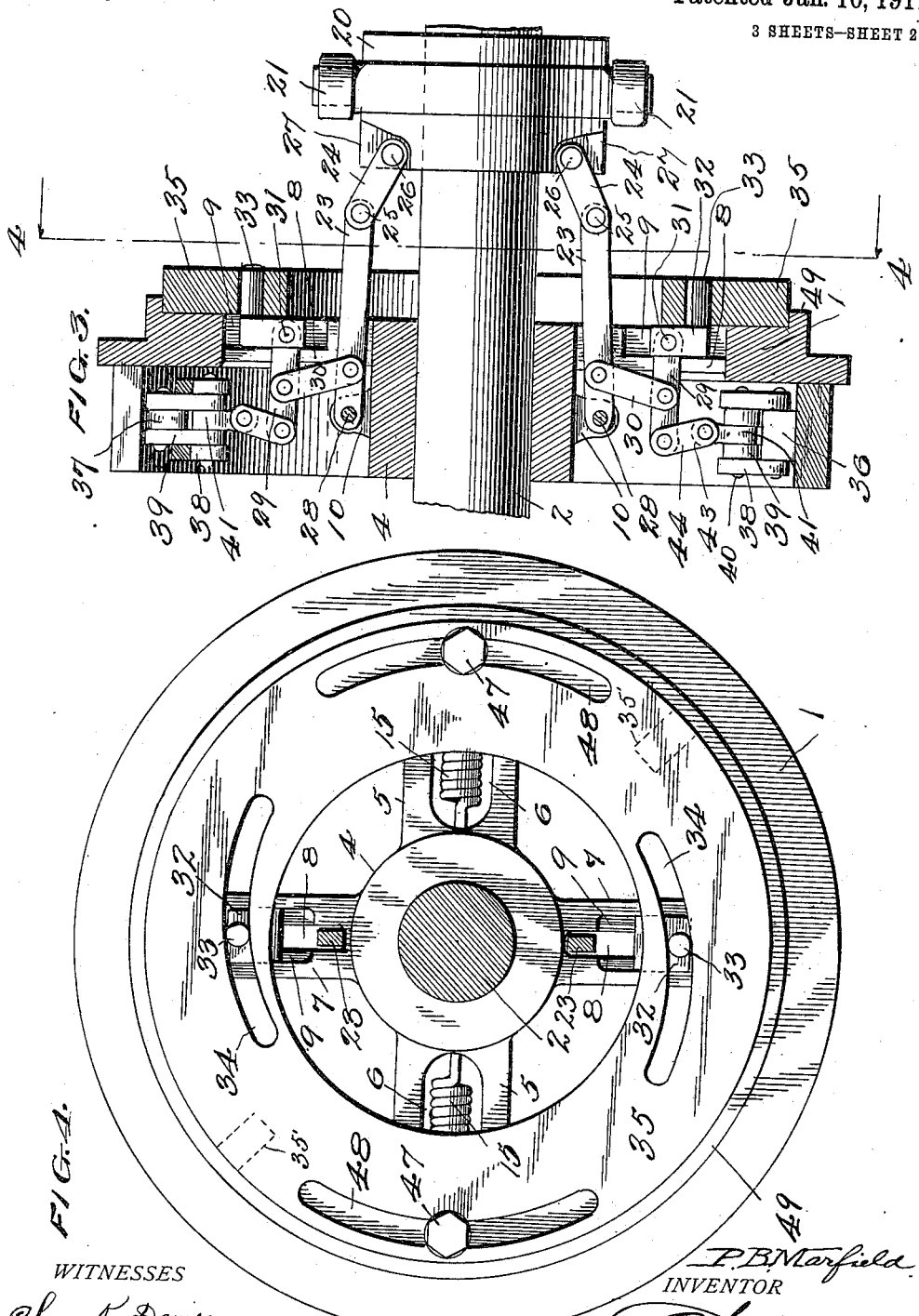
WITNESSES
INVENTOR
P. B. Marfield
By
Attorney P. B. MARFIELD.
FRICTION CLUTCH.
APPLICATION FILED FEB. 19, 1910.
981,295.
Patented Jan. 10, 1911.
3 SHEETS—SHEET 3.
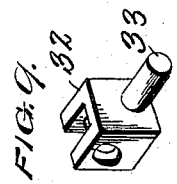
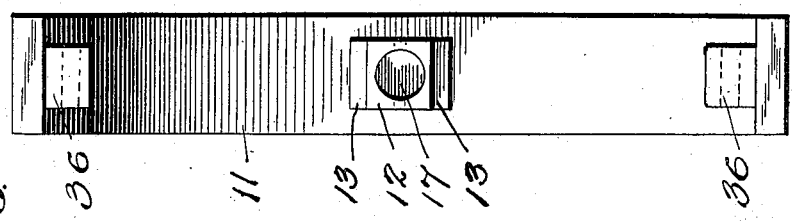
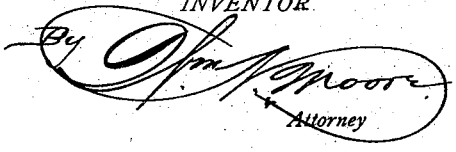
WITNESSES
INVENTOR
P. B. Marfield
Attorney

UNITED STATES PATENT OFFICE.

PAUL B. MARFIELD, OF CINCINNATI, OHIO, ASSIGNOR OF ONE-FOURTH TO DWIGHT S. MARFIELD AND ONE-FOURTH TO NEALE P. RILEY, BOTH OF CINCINNATI, OHIO.

FRICTION-CLUTCH.

981,295.

Specification of Letters Patent.   Patented Jan. 10, 1911.

Application filed February 19, 1910.  Serial No. 544,841.

*To all whom it may concern:*

Be it known that I, PAUL B. MARFIELD, a citizen of the United States, residing at Cincinnati, in the county of Hamilton and State of Ohio, have invented certain new and useful Improvements in Friction-Clutches, of which the following is a specification.

The present invention relates to improvements in friction clutches, for shafting, and is especially adapted for use with line shafting for the purpose of driving a portion thereof when connected by the clutch with the driving shaft.

The invention contemplates several improvements to the different elements of a clutch of this character, as for instance an improved construction whereby the two members of the clutch are positively engaged and disengaged in their frictional contact. Provision is made so that the driving member, which includes an expansible segmental ring, may be forced into contact with the driven member with uniform pressure at all possible points, when said expansible element is expanded or distended.

An especially noteworthy element of the invention is the utilization of means whereby the frictional contact between the driving and the driven elements of the clutch, may be controlled and adjusted, thus allowing for wear on the frictional parts, and providing means for taking up said wear, in order to preserve a mechanically accurate contact between the two members.

With the above objects in view the invention consists in a clutch comprising the usual driving and driven elements, of which the driving element includes a segmental ring capable of distension, a plurality of levers and means for moving them to distend or expand the ring, adjustable fulcrum points for the series of levers, and certain other details of construction and combinations and arrangements of elements, as fully illustrated in the drawings, described in the accompanying specification, and more particularly pointed out in the claims.

In the accompanying drawings I have illustrated one example of the physical embodiment of my invention constructed according to the best mode I have so far devised for the practical application of the principles thereof. Such embodiment I have found in the practical use of the clutch to be mechanically accurate and efficient, and to fulfil the functions of device of this character.

Figure 1 is an elevation of the rear side of one member of the clutch of my invention. Fig. 2 is a vertical central sectional view on line 2—2 of Fig. 1. Fig. 3 is a sectional view of Fig. 1, taken at right angles to Fig. 2, on the line 3—3, said line passing through different planes at the perimeter of the clutch member in order to facilitate the illustration of the parts. Fig. 4 is a front side view of the driving member of the clutch taken at line 4—4 Fig. 3. Fig. 5 is an elevation of the block or carrier, upon which are mounted and supported the mechanisms for engaging the clutch members. Fig. 6 is an inside edge view of one of the segments of the expansible member. Fig. 7 is a perspective view of a double-ended pivot link for attaching the series of levers to the expansible element, and Figs. 8 and 9 are perspective views taken from different points, of the fulcrum seat for the lever systems.

The driving member of the clutch and a portion of the actuating means therefor are supported upon the block 1, which is journaled upon the driving shaft 2, and held to rotate therewith by means of the spline or key 3, as usual. This block 1 is fashioned into an open ring from the hub 4 of which extend the pair of radial spokes 5, 5, in which the slots 6, 6 are formed. Arranged diametrically opposite to the spokes 5 are a second pair of spokes 7, 7, also provided with slots, as 8, 8, and formed adjacent these slots are the duplicate grooved portions 9, 9. A pair of diametrically arranged ears or lugs 10 project from the hub of the block, being located in the same plane as the spokes 7, 7.

The expansible ring which comprises the two segments 11, 11, is supported and carried by the block or carrier plate 1. Each of these segments is fashioned with a radially inwardly projecting arm 12 and pair of shoulders 13, the former being movable within the slots 6 in spokes 5 of the carrier plate, and the latter resting upon the bifurcated ends 14 of the extended spokes, this condition existing when the clutch is inert. A pair of diametrically disposed helical springs 15 are secured in complementary recesses 16 and 17 in the hub of the carrier and each arm of the segments respectively, and held by means of the pins 18 and 19. These springs hold the segments of the expansible ring against outward distention due to centrifugal force from the revolving driving member of the clutch, and keep the shoulders 13 in contact with the extensions 14, as described.

The clutch is actuated from the slidable spool 20 by means of the usual yoke 21. The spool is connected to the segments of the expansible ring by two systems of levers as illustrated. When the spool is moved toward the clutch the friction ring is expanded into direct contact with the driven member 22, and movement of the spool away from the clutch, positively withdraws the friction ring from its frictional contact.

Referring particularly to Fig. 3, it will be seen that I employ two master levers 23, one end of each being pivoted or fulcrumed in the ears 10 on the hub 4 and the other ends connected by links 24 and pivots 25 and 26, to an ear 27 on the spool 20. The fulcrum of each of these levers is formed by a pin 28 in the ears 10 of hub 4. A second pair of levers 29 are each connected by a link 30 to the master levers 23, the former I shall hereinafter term operating levers and the latter actuating levers. The fulcrums of the operating levers 29 are pins 31 journaled in duplicate blocks 32, and these blocks are held in adjusted position by means of shanks 33, located in eccentric slots 34 of an adjusting plate 35, to be described hereinafter. It will be understood that the links 30 are pivotally connected to the actuating and operating levers, as is the case with all the joints of the lever systems. The operating levers are connected to the adjoining ends of the segments 11, that is, each operating lever is pivotally coupled to links which are in turn pivotally connected to the adjacent ends of the segments. One of the segments, as the upper one in Fig. 1 is formed with a wide lug 36 near each of its ends, and the opposing segment is formed with a narrower lug or perforated ear 37. A pair of links 38 are pivoted in the ear 36 and a pair of links 39 complementary thereto are pivoted in ear 37, and the inner ends of these links are pivoted together by pin 40, which also passes through a perforated ear 41 of the double link 42, which is formed with an ear 43, perforated in a plane at right angles to the ear 41. The ear 43 is connected by links 44 to the operating lever 29.

As clearly seen in Fig. 1, the points of pivotancy of the links 38 and 39 are located at triangularly disposed intervals, and force applied at point 40 will tend to separate the other two points of the triangle. Thus the operation of the clutch will be evident. Movement to the left in Fig. 3, of the spool, will swing the pivoted points 25 and actuating levers 23 outwardly on pivots 28. Through the medium of the links 30, the free ends of the operating levers are swung outwardly on the fulcrum 31. The movement of the operating levers forces outwardly the links 44, which in turn press out the double ended links 42, which in turn distend the toggle links 38 and 39, and the distention of these links forces the two segments of the expansible ring diametrically away from each other, causing the perimeter 45 of each segment to frictionally engage the friction surface 46 of the driven member of the clutch, 22. The segments are forced apart in spite of the tension of the springs 15, and are positively withdrawn or contracted by reverse movement of the levers and links occasioned by sliding the spool to the right, the movement being aided by the springs.

As before stated, the action of the levers is adjustable, in order to allow for wear on the surfaces 45 and 46. To this end the disk or plate 35 is secured to the carrier plate or block 1 by means of the cap screws 47. These screws are tapped into the block 1, but are passed through concentric slots 48 in the adjusting disk or plate 35. The disk is seated in a recess on the face of the carrier formed by a flange 49, and as before stated, the fulcrum blocks 32 have their shanks 33 located in eccentric slots 34 of the disk. From this construction it is evident that by loosening the screws 47, the disk 35 may be rotated independent of the carrier block, by means of a suitable tool in holes 35′ within the limits of the slots 48. Rotation of the disk, through the medium of the slots 34 will carry the shanks 33 toward or from the shaft 2, the blocks 32 traveling in the grooves 9. In this manner the fulcrum point of the operative lever may be adjusted with relation to the expansible ring, to take up wear on the friction parts, or to adapt the ring for variations in size of the driven member of the clutch.

From the foregoing description taken in connection with the drawings, it is evident that I have provided an efficient clutch of the character described which fulfils the conditions set forth as the objects and purposes of my invention.

Minor changes, or colorable alterations, within the scope of my claims are contemplated if found desirable, but these I consider within the spirit of my invention and covered thereby.

Having thus fully described my invention, what I claim as new and desire to secure by Letters Patent is:—

1. In a friction clutch, the combination with a carrier, of a shell surrounding the same, a segmental expansible ring secured to the carrier and adapted to engage the shell, a series of levers pivotally secured together and adapted to be shifted to expand the ring, a plate rotatably secured to the carrier and having eccentric slots formed therein, fulcrums for the pivoted levers having lugs engaged in said slots, the rotation of the plate serving to shift the fulcrums, and means for securing the plate in desired position.

2. In a clutch, the combination with a carrier, of a shell surrounding the periphery thereof, an expansible ring secured to the carrier and adapted to be expanded to engage the shell, actuating levers pivotally secured to the carrier, intermediately fulcrumed operating levers pivotally connected to the ring, connections between the two sets of levers, and means for adjusting the fulcrums of the operating levers.

3. The combination in a friction clutch with the shell, of a driving member therefor comprising a carrier and a segmental expansible ring, a plurality of actuating levers fulcrumed to the carrier, means for moving said levers, a plurality of operating levers provided with radially adjustable fulcrums, links connecting the actuating and operating levers, and toggle links connecting said operating levers with the adjoining ends of the segmental ring whereby the said ring is positively expanded and contracted, and means for holding the expansible ring inert against centrifugal force.

4. A driving member of a friction clutch comprising a carrier and an expansible segmental ring supported to rotate therewith, a disk adjustably attached to the carrier and provided with eccentric slots, a plurality of actuating levers fulcrumed in the carrier, a plurality of operating levers linked to the actuating levers and having fulcrums seated in said eccentric slots, and links connecting the operating levers with the segmental ring.

5. A driving member of a friction clutch comprising a carrier formed with grooved spokes and an expansible segmental ring supported to rotate therewith, a disk adjustably secured to the carrier and provided with eccentric slots, a plurality of actuating levers fulcrumed in the carrier, a plurality of operating levers linked to the actuating levers, a movable block seated in the grooved spokes and forming the fulcrum for the operating levers, and a shank on said block engaged in the eccentric slots.

6. The combination in a driving clutch member of a carrier and an expansible friction ring, a shell adapted to be engaged by the ring, a plate attached to the carrier, a system of levers connected to said members and means for shifting said levers to positively expand and contract the friction ring, and means in conjunction with said plate and levers for taking up wear of the frictionally engaged parts of the clutch.

7. The combination in a driving clutch member of a carrier and an expansible friction ring, a shell adapted to be engaged by the ring, a plate having concentric grooves therein and attached to the carrier, eccentric grooves diametrically disposed in said plate or disk, and a plurality of systems of levers each fulcrumed to the carrier, and to means movable in said eccentric slots.

In testimony whereof I affix my signature, in presence of two witnesses.

PAUL B. MARFIELD.

Witnesses:
JOHN F. MCGARRY,
EDNA M. HERBST.